United States Patent [19]

Cauthron et al.

[11] 3,806,918

[45] Apr. 23, 1974

[54] DIGITAL PHASE LOCK LOOP

[75] Inventors: David L. Cauthron, Bedford; John D. Clayton, Dallas, both of Tex.

[73] Assignee: Recognition Equipment Incorporated, Irving, Tex.

[22] Filed: Mar. 26, 1973

[21] Appl. No.: 345,128

[52] U.S. Cl. ........... 340/347 DD, 178/68, 325/38 R

[51] Int. Cl. ........................................... H03k 13/24

[58] Field of Search ............. 340/347 DD, 347 AD; 329/122; 325/38 R, 38 A; 178/66, 67, 68

[56] References Cited

UNITED STATES PATENTS

| | | | |
|---|---|---|---|
| 3,467,777 | 9/1969 | Rumble | 178/68 X |
| 3,705,398 | 12/1972 | Kostenbauer | 340/347 DD |
| 3,720,875 | 3/1973 | Franaszer et al. | 178/68 X |
| 3,758,720 | 9/1973 | Dinn | 178/67 |

*Primary Examiner*—Joseph F. Ruggiero
*Attorney, Agent, or Firm*—Richards, Harris & Medlock

[57] ABSTRACT

A digital loop tracks the frequency and phase of an incoming signal, such as, but limited to an incoming phase encoded signal, to generate a tracking frequency signal. Zero crossings of the incoming signal are converted into trigger pulses for activating and terminating an up/down counter. The counter advances up from a reference level to a count stored in an average count storage register and then reverses direction and counts down to the initial reference. The counter cycle continues until a zero crossing pulse terminates the operation which may be any place along the count cycle of the up/down counter but preferably when the counter counts down to the reference level. A difference between the count in the up/down counter and the initial reference level is stored in an error counter register and this value is added to an accumulated error code stored in an accumulator register. When the accumulated error exceeds a predetermined limit, the count stored in the average count storage register is incremented by an amount and in a direction such that the up/down counter counts down to the reference level at the next zero crossing pulse. When this condition exists the phase lock loop is locked onto the frequency of the incoming signal and varies therewith.

22 Claims, 7 Drawing Figures

DIGITAL PHASE LOCK LOOP

This invention relates to a digital phase lock loop and more particularly to the recovery of binary information from a phase encoded information signal.

Magnetic tape recording of data has greatly enhanced the exchange of information due to the simplicity and reliability of magnetic tape recorders and play back equipment. While data may be recorded on magnetic tape with relative ease, the play back of such tape for the recovery of data thereon presents problems to the variation in frequency of the encoded data primarily due to an inability to maintain the tape drive speed constant over extended periods of time. For example, the use of magnetic tape recording presents a problem in the recovery of binary data encoded into a phase encoded format. The direction of phase shift at the data bit shift time determines the data recorded, but it also specifies the phase of the signal for ½ bit period before and after the data bit shift time. To recover such phase encoded data, it is thus essential to track both the frequency and phase of the recorded signal.

Heretofore, several techniques have been used to decode phase encoded information; these can be reduced to two basic types generally referred to as tracking and nontracking. The nontracking technique basically blanks the insignificant or phase bit axis crossing and allows the data to be strobed after the significant or data bits axis crossing. Under idealistic conditions the incoming signal will remain on a specific side of the axis for ½ bit period after any data bit axis crossing. Any phase bit axis crossing would occur ½ bit period after the last data bit axis crossing and by knowing the direction of the data bit crossing and the preamble of the recorded data, it is possible to inhibit any crossing for 75 percent of a bit period from any data bit axis crossing, which would inhibit the phase bit axis crossing and allow the next data bit axis crossing. In this manner the data is strobed at 25 percent of the bit period after any data bit axis crossing and the information during these strobe periods is decoded. This same procedure is continued through the remainder of the recorded data. However, for the nontracking technique to function, the total variation in density and flux reversal spacing must be less than 25 percent, or either a phase bit axis crossing will not be inhibited or a data bit axis crossing will be inhibited. In either case the nontracking technique produces an error in decoding the information.

With the tracking technique, an attempt is made to track the density variation in the recorded information to eliminate its effect from the recorded data. The flux reversal spacing variations, however, cannot be tracked out, but by reducing the density variations to a small tracking error, the sum of the two can be kept below an acceptable minimum standard. Previously, tracking techniques used analog phase lock systems which in many respects are similar to analog servo feedback loops. These systems are what is normally called a type-1 servo feedback loop which means the loop tracks the frequency and phase of the signal with a constant phase error. Thus, present analog techniques track the incoming signal by having the frequency of an internal feedback loop at a predetermined value away from the nominal value of the incoming signal. If the incoming signal drops out momentarily, the loop will be brought back toward the nominal value.

In accordance with the present invention, digital components of an internal loop acquire a phase lock and track any frequency variation within a reasonable range in order to maintain the phase lock. An advantage of the present invention is that the internal phase lock loop is completely digital and therefore less subject to component drift. Another feature of the present invention is that the characteristics of the digital internal loop may be changed by modifying the internal loop deviser. Two different loop devisers may be used, if desired, with one for acquiring the initial phase lock and the second for continued tracking of the lock. External control logic switches from one to the other of the system devisers. Still another feature of the present invention is that the digital internal loop tracks input signals other than pure sine waves or square wave signals. Typically, a phase encoded signal consists of some nominal input frequency with some of the axis crossings of the signal missing which results in the phase changes of the signal. On an instantaneous basis, the signal represents a sine wave signal at its fundamental frequency or its first subharmonic frequency. The system of the present invention will track a signal containing fundamental and subharmonic frequencies.

In addition to tracking phase encoded signals recorded on magnetic tape, the present invention is applicable to other problems or fields requiring a phase lock loop for tracking an incoming signal. Further, the system is not limited to tracking a single incoming signal frequency. The system will only track one frequency at a time, but the incoming signal may be one frequency or one block of data and another frequency on a later block of data and the system will track either frequency. The system input clock is changed to accommodate the different frequency of input signal.

In accordance with one embodiment of the invention, a digital phase lock system responsive to an input wave includes first means for generating a crossing pulse signal at each occurrence of a predetermined value of the input wave. A second means cyclically counts from a reference level a series of generated clock pulses in response to a first crossing pulse to a termination produced by a subsequent crossing pulse. A count storage register maintains an average count of one-half the number of clock pulses generated between subsequent pairs of the crossing pulses and this average count is changed in accordance with the average deviation of the counted clock pulses in the second means from the reference level for each period between subsequent crossing pulses. The counting characteristics of the second means are then varied in accordance with the change in the average count in the storage means.

A more complete understanding of the invention and its advantages will be apparent from the specification and claims and from the accompanying drawings illustrative of the invention.

Referring to the drawings.

Figure 1A:
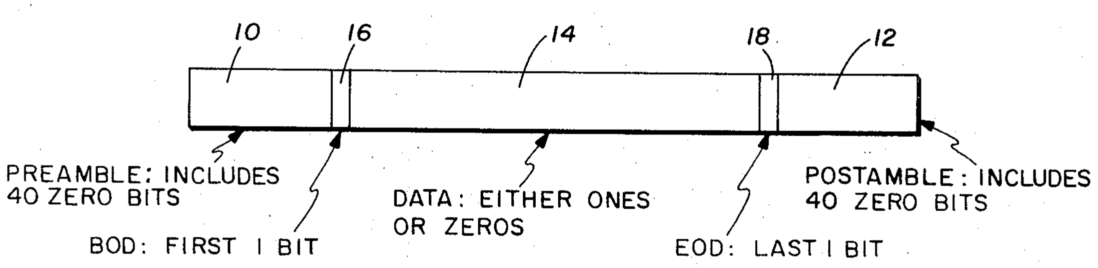
FIG. 1A is a block format of phase encoded data on a magnetic tape for one track of a multiple track system.

Referring to FIG. 1A, there is indicated the format of typical magnetic tape recorded phase encoded data defined by a block of encoded data including a forty bit preamble 10 and a forty bit postamble 12 with encoded data contained within a section 14. Intermediate between the preamble 10 and the data section 14 is a "beginning-of-data" bit 16 and intermediate the data section 14 and the postamble 12 is an "end-of-data" bit 18. In a typical nine track system, each track includes a section of magnetic tape all written or read simultaneously and together making up one data byte of eight bits of information plus a parity bit. Each data track requires the phase encoded circuit in accordance with the present invention.

Figure 1B:
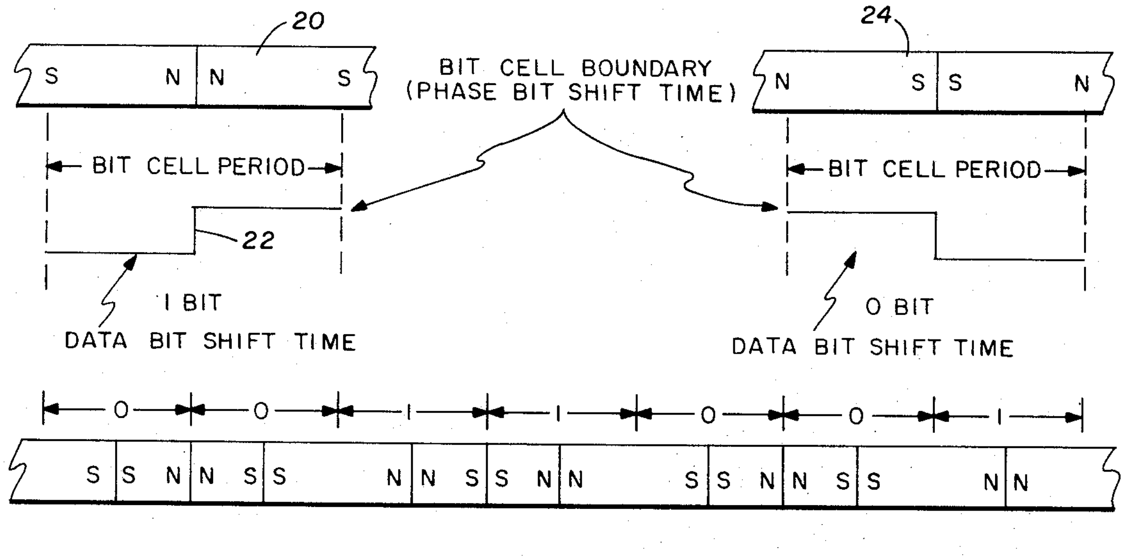
FIG. 1B illustrates a definition of phase encoded magnetic polarity for both logic ONES and logic ZEROES.

Referring to FIG. 1B, the magnetic polarity shown indicates the phase of the recorded signal. The tape 20 represents one bit cell period and the direction of shift in magnetic polarity at the data bit shift time 22 determines the data recorded, and also specifies the phase of the signal for ½ bit period before and after the data bit shift time. The bit cell period of tape 20 with the magnetic polarity indicated represents a logic ONE bit while a bit cell period of a tape 24 represents a logic ZERO bit. The lower portion of FIG. 1B represents a train of data bits of both logic ZERO and logic ONE wherein each data bit is included within one bit cell period on the magnetic tape.

Standards for recording information on magnetic tape for data exchange have been established by various agencies, such as the United States of America Standard for Information Exchange. In accordance with such standards, magnetic tape is recorded at the rate of 1,600 characters per inch utilizing phase encoding techniques. Two problems almost universally encountered in magnetic tape encoding are that the frequency of the incoming signals may not be constant and the tape drive speed varies.

Figure 2:
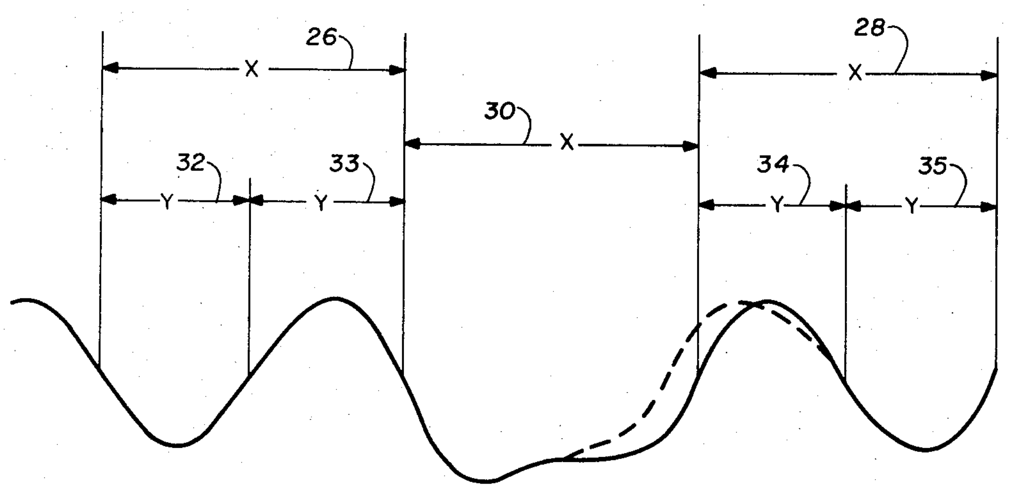
FIG. 2 is a waveform of a phase encoded signal showing flux reversal character spacing requirement.

Referring to FIG. 2, there is shown a flux reversal character spacing curve wherein, in accordance with the above standard, the spacing between successive data bits without an intervening phase flux reversal is to be maintained between 85 percent and 108 percent of the short term character spacing. The short term average character spacing, one bit period, is given by the letter X with the short term average one-half frame bit period spacing given by the letter Y. The spacing between successive data bits with an intervening phase flux reversal should be maintained between 93 percent and 112 percent of the short term character spacing. The latter is identified by the periods 26 and 28 and the former by the period 30. Also in accordance with the above standards, the spacing between the data bit and any adjacent phase flux reversal is to be maintained between 44 percent and 62 percent of the short term character spacing. This character spacing requirement is identified by the half-frame periods 32–35.

Figure 3:
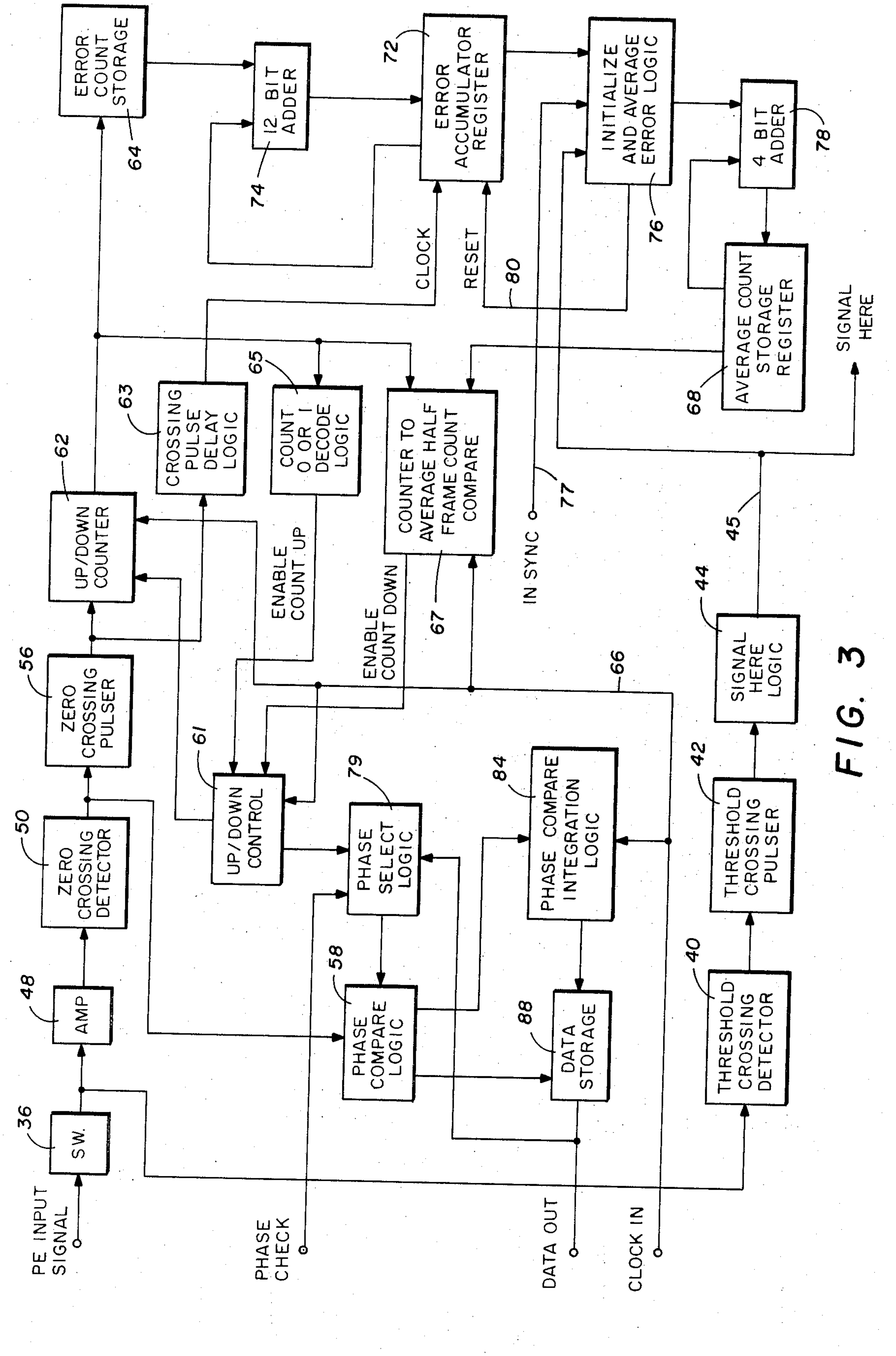
FIG. 3 is a block diagram of digital circuitry for decoding phase encoded signals including a digital internal phase lock loop.

Referring to FIG. 3, there is shown a block diagram of digital circuitry for decoding phase encoded signals stored on magnetic tape in accordance with the character spacing requirements as illustrated in FIG. 2. A phase encoded input signal is applied to a logic switch 36 actuated by an enable signal on a line 38. The phase encoded input signal from the switch 36 is coupled to a threshold crossing detector 40, from the detector 40 to a threshold crossing pulser 42 and then to signal-here logic 44.

Typically, the threshold crossing detector 40 produces a square wave from the phase encoded data and couples this wave to the pulser 42. The threshold crossing pulser 42 generates a series of pulse signals to the signal-here logic 44. The signal-here logic 44 has as a function the determination of when the incoming signal is present and to generate a signal-here or detected indication on the line 45 when the phase encoded input signal is present for five consecutive bit periods. The enable signal on the line 45 will switch low if there are any gaps in the bit periods with no crossings. In addition to coupling to the tape controller along with similar signals from other data tracks, the enable signal is also coupled to initialize and average error logic 76, as will be explained.

From the switching logic 36, a phase encoded input signal is applied to the input of an amplifier 48 wherein it is amplified and coupled to the input of a zero crossing detector 50. The zero crossing detector 50 comprises logic for generating a square wave having frequency and phase shift characteristics of the phase encoded input signal.

Figure 4:
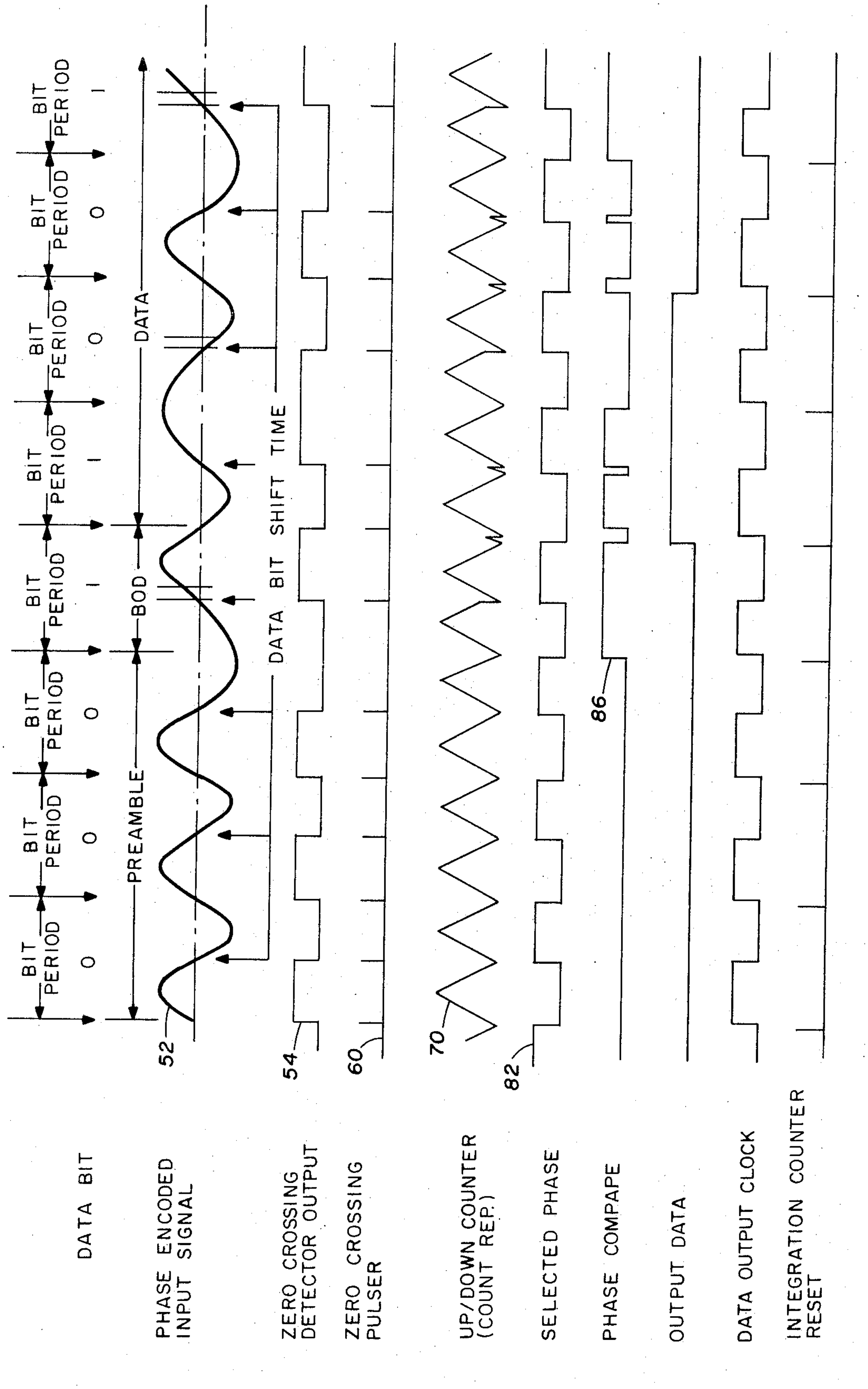
FIG. 4 is a series of timing diagrams for the digital decoding loop for a phase encoded signal for the system of FIG. 3.

Referring to FIG. 4, a phase encoded input signal is represented by the curve 52 and the output of the zero crossing detector 50 represented by the curve 54.

The square wave output of the detector 50 is coupled to a zero crossing pulser 56 and to phase compare logic 58. In the zero crossing pulser 56 the square wave is utilized to produce a series of zero crossing pulses as represented by the curve 60 of FIG. 4. Consequently, the zero crossing pulser 56 outputs a pulse anytime the detector 50 switches thereby indicating an axis crossing of the incoming phase encoded signal. The incoming phase encoded signal is a differentiated read-head signal which means the data is dependent on the crossings of the signal and not on the amplitude of the signal.

Zero crossing pulses from the pulser 56 are applied to an up/down counter 62 and through delay logic 63 to an error accumulator register 72 to trigger the operation thereof. Upon the occurrence of a zero crossing pulse and in response to a control signal from an up/-down controller 61, the counter 62 commences to total counts of clock pulses applied to a line 66. After counting clock pulses up to a level stored in an average count storage register 68 as determined by a comparison of the output of the counter 62 and the output of the count storage register 68 in count compare logic 67, the counter reverses direction and then counts down to a zero reference level and again reverses direction and begins to count up. The up/down controller 61 provides the count up signal to the counter 62 in response to the output of decode logic 65 connected to the output of the counter 62. The counter continues to count up from the zero reference to a level represented in the register 68 and then back down to zero until a subsequent zero crossing pulse is generated at the output of the pulser 56. Curve 70 of FIG. 4 represents the up/-down count of the counter 62. If the internal loop controlling the up/down counter 62 were enabled with no signal coming in, the counter would count up to the number stored in the average count storage register 68, count back down to zero, and start counting up again in the continuing sequence as illustrated by the first part of the curve 70.

Whenever a zero crossing pulse is generated at the pulser 56, the number in the counter 62 is divided by two and stored in the error count storage register 64 along with a sign bit indicating whether the counter was counting up or down. The up/down controller 61 then resets the counter 62 in response to the decode logic 65 and it starts counting up from the reference level, as explained. If the number in the error count storage register 64 is negative, the counter 62 was counting down, and if positive, it was counting up. By dividing the output of the counter 62 by two, the error stored in the register 64 represents the error between the frequency of the incoming signal and the frequency of the internal loop over one-half a bit period, as represented by the average count storage in the register 68.

After each zero crossing pulse, the error stored in the register 64 is added to the accumulated error in an error accumulating register 72 in response to the output of the delay logic 63. This addition is accomplished by circulating the value of the register 72 through a 12-bit adder 74 interconnected between the registers 64 and 72. When the accumulated error in the register 72 is a positive or negative number larger than a selected divider as established by average error logic 76, then the value of one clock pulse received over the clock line 66 will be added to or subtracted from the value in the average count storage register 68. This addition or subtraction is accomplished by circulating the value in the register 68 through a 4-bit adder 78. It is this new total stored in the register 68 that is then compared with the output of the counter 62 in the compare logic 67 to enable the down count through the controller 61.

In addition to generating a 1-bit signal to the adder 78, the logic 76 also generates a reset signal on a line 80. Any time one digit is added to or subtracted from the average count in the storage register 68, the error accumulator register 72 is reset to 0. This assures that the stored error is based on the present count of the counter loop and wipes out a residual number based upon some previous count.

Since the zero crossing pulser 56 produces a pulse for each ½ bit period and since the register 68 stores a count representing one-half the total desired count of the counter 62, the number stored in the average count storage register 68 represents the count for ¼ bit period. Also, since the period of the internal loop for the counter 62 is ½ bit period as controlled by the output of the pulser 56, the error as stored in the register 64 will be based upon a ½ bit period. Thus, a change in the average count storage in the register 68 of one digit will result in a two count change in the ½ bit period (one more or less count up and one more or less count down). Consequently, any error from the up/down counter 62 stored in the register 64 should be divided by two. In this manner, the error stored in the register 64 will represent the amount the average count storage register 68 should be modified in order for the internal loop to run at the rate of the incoming signal. When the loop for the counter 62 is locked on the incoming signal frequency, the counter should count to zero at approximately the same time as the occurrence of the next zero crossing pulse from the pulser 56. The loop will adjust its count by means of the error counts stored in an attempt to complete this operation.

One of the advantages of the digital system disclosed is that the characteristics of the loop may be changed by modifying the average error logic 76. Several levels of accumulated error may be set in the logic 76, for example one for acquiring a frequency lock during the preamble 10 and a second for tracking the data during the section 14. External control logic (not shown) connected to the line 77 switches the logic 76 from one accumulated error level to the other at the end of the preamble 10. Another advantage of the system is that the average count storage register 68 is set to a nominal value prior to receiving a phase encoded signal. The nominal frequency which the loop will track is set by the frequency of the input clock applied to the line 66. Therefore, the loop will track different frequency ranges by changing the input clock rate. If the phase encoded input signal momentarily disappears, the loop including the counter 62 will continue to run at the last data rate input until it is either reset or the phase encoded signal reappears.

Data from the phase encoded input signal is recovered by completing a phase comparison between the outputs of the zero crossing detector 50 and a selected phase as one output of the phase select logic 79 connected to the up/down controller 61. The selected phase is represented by the curve 82 of FIG. 4. A comparison in the logic 58 between the output of the detector 50 and the selected phase is integrated over one bit period by a digital integrator 84. The signal to be integrated, that is the output of the logic 58, is represented by the curve 86 of FIG. 4 and it is this signal that is integrated over one bit period. At the end of the bit period, if the phase of the output of the detector 50 was the same as the selected phase of curve 82 for 50 percent or more of the bit period, the output data from data storage logic 88 is a logic ONE. If the output of the detector 50, as coupled through the logic 58 to the logic 88 and the selected phase signal were in phase less than 50 percent of a bit period the output data is logic ZERO. Thus, the encoded data as supplied to the switch 36 is recovered at the output of the data storage logic 88 by a phase comparison of the output of the detector 50 and a selected phase signal as generated by operation of the counter 62. Identification of the data is made by the integration logic 84.

Figure 5:
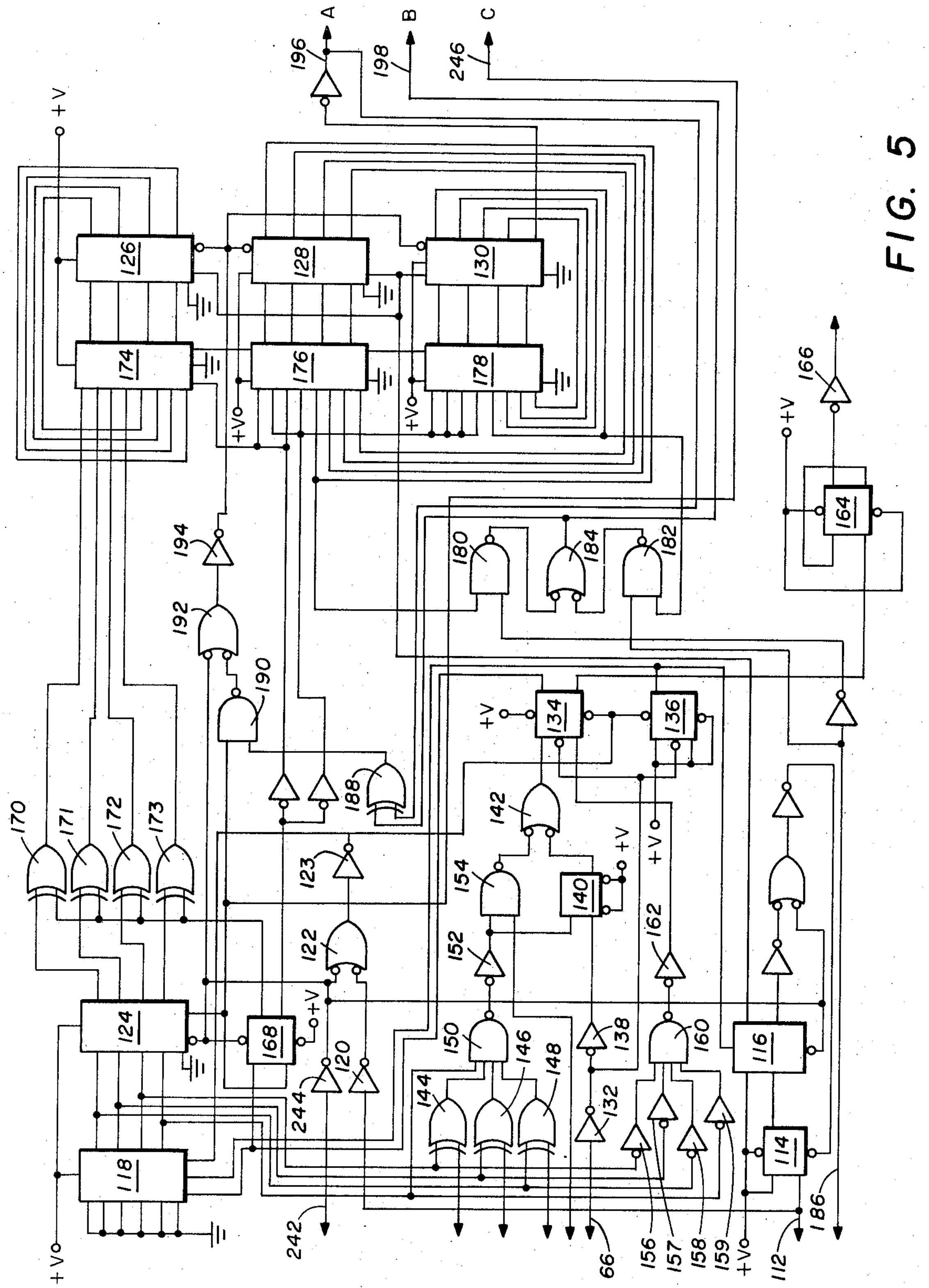
FIGS. 5 and 6 are schematic logic diagrams of the digital internal phase lock loop of FIG. 3.
Figure 6:
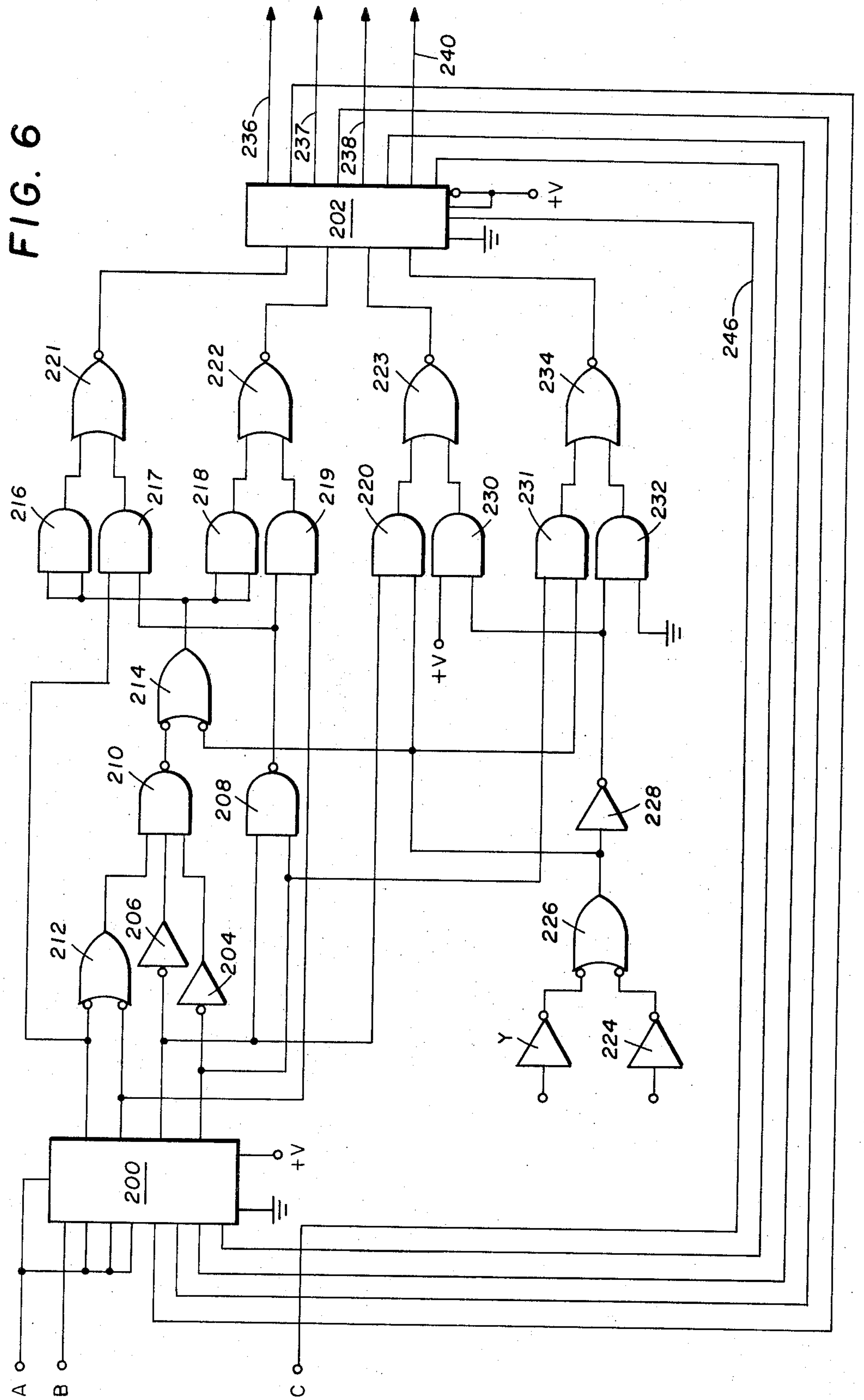

Referring to FIGS. 5 and 6, there is shown logic diagrams for the internal loop of the system of FIG. 3 for locking onto the frequency of the phase encoded input signal coupled to the switch 36. Zero crossing pulses from the pulser 56 appear on line 112 and are coupled through a logic inverter 120 and OR gate 122 to register 124 as the error count storage 64. From the output of the OR gate 122 the zero crossing pulse is coupled through another logic inverter 123 to reset the flip-flop 136 and counter 118 of the up/down counter 62. The zero crossing pulse on line 112 is a clock pulse input to flip-flop 114, coupled through shift register 116 (used as a delay), and is applied to the clock input of registers 126, 128 and 130 as the error accumulating register 72.

Input clock pulses on the line 66 are coupled through logical inverter 132 to the clock terminal of J/K flip-flops 134 and 136. Flip-flop 136 is a part of the up/down counter 62 along with register 118. Flip-flop 134 is the up/down control for the up/down counter 62.

Input clock pulses from the inverter 132 are also coupled through inverter 138 into the clock input of flip-flop 140.

The logic network including exclusive OR gates 144, 146 and 148, NAND gates 150, 154 and gate 142 used as an OR gate, inverter 152 and flip-flop 140 used to enable flip-flop 134 to set and start the up/down counter to counting down. The exclusive OR gates and NAND gates 150 and 154 compare the output of the counter to the average count storage and enable flip-flop 134 to set and start the up/down counter counting down. The count in register 118 is also applied through inverters 156–159 to a NAND gate 160 and through inverter 162 to the K input of the flip-flop 134 enabling it to reset. When counter 118 reaches a count of zero flip-flop 134 is reset and the up/down counter started counting up. Thus, the up/down counter including counter 118 and flip-flop 136 are coupled into a circulating loop under control of flip-flop 134.

One output of the flip-flop 134 is tied to a flip-flop 164 having an output to an inverter which is either used as is or inverted to generate the selected phase as given by curve 82 of FIG. 4. The second output of the flip-flop 134, in addition to a connection to the register 118, is also tied to a flip-flop 168 as the sign bit of the error count storage 64.

As explained previously, the occurrence of a zero crossing pulse causes the count in the up/down counter 62 (register 118) to be stored in the error storage register 64 (register 124). This error count is then added to the accumulated error in the accumulated error register 72. This addition is completed by coupling the output of the register 124 through exclusive OR gates 170–173 to the input of an adder 174 as part of the twelve bit adder 74 that also includes adders 176 and 178. The 12 bit adder registers 174, 176 and 178 are connected in a circulating configuration with registers 126, 128 and 130, respectively; the latter comprises the error accumulating register 72 of FIG. 3.

Tied to one output of the register 128 and one output of the register 130 is the average error logic 76 comprising NAND gates 180 and 182 along with an OR gate 184. As mentioned previously, the level of accumulated error required to cause an updating of the average count in the storage register 68 may be varied. This is completed by means of an external signal applied to a line 186 as part of the input circuit to the NAND gates 180 and 182.

Also coupled to the output of the OR gate 184 of the error logic 76 is an exclusive OR gate 188 as part of a reset circuit for the registers 126, 128 and 130. Included in the reset circuit is a NAND gate 190, an OR gate 192 and an inverter 194 having an output coupled to the clear terminal of the registers 126, 128 and 130.

An accumulated error count in the registers 126, 128 and 130 in excess of the value established by the error logic 76 appears on output lines 196 and 198 as inputs to an adder 200 as the four bit adder 78. A count in the adder 200 is added to or subtracted from the average count in the storage 68 by coupling the outputs of the adder through logic to the inputs of a register 202 as part of the average count storage register 68. Intermediate logic between the adder 200 and the average count storage register 202 includes inverters 204 and 206, NAND gates 208 and 210, OR gates 212 and 214, AND gates 216–220 and 230–232 and NOR gates 221–223 and 234. This intermediate logic stores a nominal count in the average count storage for initialization before data is received through switch 36 and places a limit on the frequency range over which the loop can be adjusted by limiting the range of the number that may be stored in the average count storage 68. Also coupled to the intermediate logic is logic for determining the presence of a phase encoded input record or signal at switch 36. This logic includes inverters 224, 226 and Y and OR gate 226.

The average count stored in the register 202 appears on output lines 236–240 connected to the exclusive OR gates 144, 146 and 148 and to the NAND gate 154 as part of the control circuit for the flip-flop 134.

Initially the system may be preset by generating a signal on a line 242 through an inverter 244 coupled to the OR gate 122. An output of the OR gate 122 is applied to the register 202 over a line 246, terminal C of FIGS. 5 and 6.

Operationally, the logic of FIGS. 5 and 6 generates the signal used to derive selected phase of curve 82 at the output of the inverter 166. Inputs to the logic circuitry include the zero crossing pulse on line 112 and the incoming clock pulses on line 66. Functionally, the logic performs as explained previously with respect to FIG. 3.

While only one embodiment of the invention, together with modifications thereof, has been described in detail herein and shown in the accompanying drawings, it will be evident that various further modifications are possible without departing from the scope of the invention.

What is claimed is:

1. A digital phase lock system responsive to an input wave, comprising in combination:

first means for generating a crossing pulse signal at each occurrence of a predetermined value of the input wave, second means for cyclically counting from a reference level generated clock pulses in response to a first crossing pulse and terminated by a subsequent crossing pulse, count storage means for maintaining an average count of the number of clock pulses generated between subsequent pairs of crossing pulses, means for changing the average count in said storage means in accordance with the average deviation of the counted clock pulses from the reference level for subsequent periods between crossing pulses, and means for varying the counting characteristics of said second means in accordance with the change in the average count in said storage means.

2. A digital phase lock system as set forth in claim 1 including means for resetting said second means to the reference level count between subsequent clock pulses.

3. A digital phase lock system as set forth in claim 1 wherein said means for changing the average count includes means for storing the deviation of the clock pulses counted by said second means from the reference level at the subsequent crossing pulse.

4. A digital phase lock system as set forth in claim 3 wherein said means for changing the average count includes means for averaging the deviation of the clock pulses from the reference level for subsequent periods between crossing pulses.

5. A digital phase lock system as set forth in claim 4 including means responsive to the average deviation of clock pulses from the reference level to vary the count characteristics when said average deviation exceeds a predetermined limit.

6. A digital phase lock system as set forth in claim 1 including means responsive to the count characteristics of said second means for generating a phase signal having a frequency and phase tracking the input wave.

7. A digital phase lock system responsive to a phase encoded input wave, comprising in combination:

first means for generating a square wave signal related to the phase encoded input data, second means for generating a crossing pulse signal at a predetermined value of the phase encoded input wave, third means for cyclically counting in a positive and negative sense from a reference level generated clock pulses in response to a first crossing pulse and terminated by a subsequent crossing pulse, count storage means for maintaining an average count of the number of counted clock pulses generated between subsequent pairs of crossing pulses, means for changing the average count in said storage means in accordance with average deviation of the counted clock pulses from the reference level for subsequent periods between crossing pulses, and means for varying the counting characteristics of said third means in accordance with the change in the average count in said storage means.

8. A digital phase lock system as set forth in claim 7 wherein said third means counts in a positive sense from a zero reference level for an adjustable number of clock pulses and then in a negative sense to the zero reference level and repeats until a subsequent crossing pulse.

9. A digital phase lock system as set forth in claim 8 wherein said count storage means maintains an average count of the number of counted clock pulses from the zero reference level to the adjustable maximum level.

10. A digital phase lock system as set forth in claim 9 wherein said means for changing the average count in said storage means varies the maximum positive sense count limit.

11. A digital phase lock system as set forth in claim 7 including means for resetting said third means to the reference level count between subsequent clock pulses.

12. A digital phase lock system as set forth in claim 7 wherein said means for changing includes means for storing the deviation of the clock pulses counted by said third means from the reference level at the subsequent crossing pulse.

13. A digital phase lock system as set forth in claim 12 wherein said means for storing the deviation includes means for dividing the deviation by a preselected factor.

14. A digital phase lock system as set forth in claim 13 including means for averaging the divided deviation of clock pulses from the reference level for subsequent periods between crossing pulses.

15. A digital phase lock system as set forth in claim 14 including means responsive to the average deviation to vary the count characteristics when the average deviation exceeds a predetermined limit.

16. A system for decoding phase encoded input data, comprising in combination:

first means for generating a square wave signal related to the phase encoded input data, second means responsive to the generated square wave for producing a selected phase signal having a frequency tracking the frequency of the input data, third means receiving and comparing the square wave signal and the selected phase signal and generating a comparison for a preselected relationship therebetween, fourth means for integrating the comparison over a period of the encoded input data, and fifth means responsive to said fourth means to provide recovered data from the encoded input.

17. A system for decoding phase encoded input data as set forth in claim 16 wherein said fifth means generates logic ONE data when the integration of the comparison signal exists at least over 50 percent of an integration period and logic ZERO data when less than 50 percent of a period.

18. A system for decoding phase encoded input data as set forth in claim 16 wherein said second means includes:

means for cyclically counting from a reference level generated clock pulses in response to a first change in direction of the generated square wave and terminated by a subsequent change in direction, count storage means for maintaining an average count of the number of counted clock pulses generated between subsequent changes in direction of the generated square wave, and means for varying the count characteristics of said means for cyclically counting in accordance with the deviation of the counted clock pulses from the reference level exceeding the stored average count.

19. A system for decoding phase encoded input data as set forth in claim 18 including means responsive to the average count in said storage means for producing the selected phase signal.

20. A system for decoding phase encoded input data as set forth in claim 18 including means for varying the counting characteristics of said means for cyclically counting in accordance with the change in the average count in said storage means.

21. A system for decoding phase encoded input data as set forth in claim 18 including means for resetting said means for cyclically counting to the reference level count between subsequent clock pulses.

22. A system for decoding phase encoded input data as set forth in claim 21 wherein said means for cyclically counts counts from a zero reference level to an adjustable maximum in a positive sense and then in a negative sense to the zero reference level and repeats until a subsequent change in direction of the generated square wave.

* * * * *